UNITED STATES PATENT OFFICE.

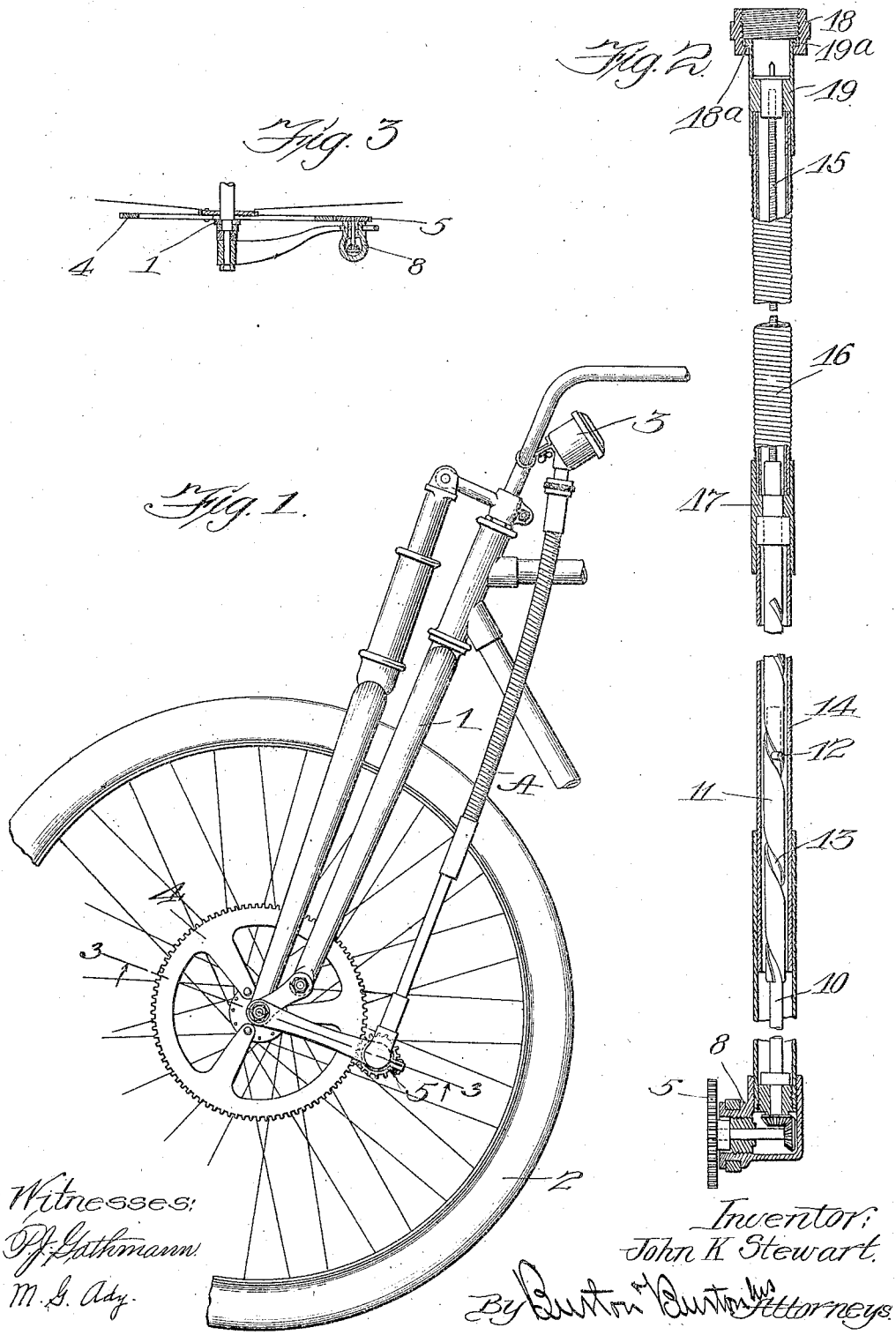

JOHN KERWIN STEWART, OF CHICAGO, ILLINOIS.

MOTOR-CYCLE-SPEED-INDICATOR DRIVE CONNECTION.

996,295.   Specification of Letters Patent.   Patented June 27, 1911.

Application filed February 25, 1910. Serial No. 545,888.

*To all whom it may concern:*

Be it known that I, JOHN K. STEWART, a citizen of the United States, residing at Chicago, in the county of Cook and State of Illinois, have invented new and useful Improvements in Motor-Cycle-Speed-Indicator Drive Connections, of which the following is a specification, reference being had to the accompanying drawings, forming a part thereof.

The purpose of this invention is to provide an improved connection for transmitting driving power to the speed indicator upon a motor cycle, adapted to prevent the inaccurate reading of the speedometer which is liable to be caused by the provision existing in the motor cycle for cushioning the steering wheel.

It consists in the features of construction shown and described as indicated in the claims.

In the drawings:—Figure 1 is a side elevation of the forward portion of a motor cycle having a speedometer equipped with this invention. Fig. 2 is a partly sectional elevation of the driving connection, section being made axially at the portion of the length containing the features embodying the invention. Fig. 3 is a detail section at the line 3—3 on Fig. 2.

The drawings represent a common construction of the steering member of a motor cycle comprising a resilient fork member, 1, at the lower end of which the steering wheel, 2, is journaled, and having mounted on the handle bar, in the customary position convenient for reading, a speedometer represented conventionally at 3, the driving power for operating the speedometer being transmitted from a gear, 4, on the steering wheel which meshes with a pinion, 5, which is connected in any suitable manner with a lower end of a flexible shaft represented in its entirety by the reference letter, A, and connected at the upper end with the speedometer.

In order to accommodate the relative change of position of the handle bar and the steering wheel axle due to the resiliency of the fork member which is provided for cushioning the steering wheel in traveling over rough road or obstructions, the usual method of mounting the pinion, 5, is illustrated consisting in journaling it, with its connections to the flexible shaft, in a bearing, 8, pivoted for swinging about the axis of the steering wheel and gear, 4, which drives said pinion, the pinion being positioned at the front or rear,—preferably at the rear, as illustrated,—of the gear, so that the up-and-down movement which it receives in the up-and-down movement of the handle bar relatively to the wheel causes it to traverse a limited arc whose chord is substantially parallel to the steering head axis at the side of the gear, 4, at which it is thus positioned. In traversing this arc, it is unavoidable that the speed of the pinion derived from the gear is increased in the downward movement and diminished in the upward movement, and that to this extent the speed indication of the speedometer will be for the instant rendered inaccurate; and since more or less of such up-and-down movement is constantly occurring in traveling over an uneven road, the index needle of the indicator will be constantly fluctuating, rendering it difficult for the rider to quickly read its indication, and also making that indication more or less uncertain within a limited range. To adapt the flexible shaft to accommodate this vertical movement and also to prevent the inaccuracy and uncertainty of indication resulting therefrom, as above explained, the lowest element, 10, of the rotary member of the flexible shaft which is directly connected to the gearing mounted in the bearing, 8, is telescoped within the next member, 11, of said flexible shaft, and the two members, 10 and 11, are connected for transmitting power by a cross pin, 12, in the lower member, 10, engaging a spiral slot, 13, in the upper member, 11. Both said members are included within the lower member, 14, of the casing, which, for a distance covering the entire extent of the spiral slot and engagement therewith of the cross-pin, is a piece of rigid tubing, the construction being such as to dispense with flexibility for the necessary distance. The direction of the spiral is such as to counteract the rotation of the shaft derived from the up-and-down movement of the pinion, 5, about the gear, 4. When the pinion is mounted at the rear side of the gear, as illustrated, the slot required is a left-hand spiral,—that is, has the direction of the thread of a left-hand screw, as illustrated.

Any convenient form of connection may be employed for transmission from the upper end of the spirally slotted member 11, with the speedometer. As illustrated, said member, 11, has a flexible shaft, 15, in the customary form of a closely wound spiral attached to its upper end and extending thence within the flexible shaft casing, 16, to the upper end thereof for connection with the speedometer train. The upper portion of the flexible shaft above so much as is necessary to provide a straight way for the members, 10 and 11, at their spiral slot connections, is preferably flexible, as illustrated at 16, said flexible portion being coupled to the lower rigid tubular portion by a coupling, 17. The usual provision for connecting the casing of the flexible shaft at the upper end with the speedometer casing is employed, consisting of a coupling nut, 18, having an interior flange, 18ª, at its lower end which engages an exterior flange, 19ª, of the terminal fitting, 19, of the flexible shaft casing.

I claim:—

1. A speedometer driving connection comprising two members of a rotating shaft, one member having a spiral slot and the other member having a projection engaged therewith.

2. A speedometer driving connection comprising two members of a transmitting shaft, one telescoped within the other, the outer member having a spiral slot and the inner member having a pin engaging such slot.

3. A speedometer driving connection comprising a transmitting shaft, one end of which is adapted for connection with a speedometer, the other end being adapted for connection with rotating means, said transmitting shaft comprising two members which are connected with each other for rotation by a spiral feature in one member, and a coöperating feature in the other member engaging with the spiral, the pitch of the spiral being such as to permit easy longitudinal movement of the two members relatively to each other at their spiral engagement by direct longitudinal thrust of the one toward the other, and means for maintaining said two members in axial alinement throughout the range of their spiral engagement.

4. A speedometer driving connection comprising a transmitting shaft, one end of which is adapted for connection with a speedometer, the other end being adapted for connection with rotating means, said transmitting shaft comprising two members which are connected with each other for rotation by a spiral feature in one member and a coöperating feature in the other member engaging with the spiral, the pitch of the spiral being such as to permit easy longitudinal movement of the two members relatively to each other at their spiral engagement by direct longitudinal thrust of the one toward the other, said members being telescoped with each other for maintaining them in axial alinement throughout the range of their spiral engagement.

5. A speedometer driving connection comprising a transmitting shaft, one end of which is adapted for connection with a speedometer, the other end being adapted for connection with rotating means, said transmitting shaft comprising two members which are connected with each other for rotation by a spiral feature in one member and a coöperating feature in the other member engaging with the spiral, the pitch of the spiral being such as to permit easy longitudinal movement of the two members relatively to each other at their spiral engagement by direct longitudinal thrust of the one toward the other, and a tubular casing in which said two members are inclosed throughout the range of their spiral engagement.

6. In combination with a motor cycle having a frame and a steering wheel mounted for up-and-down movement with respect thereto; a speedometer and driving connection therefor comprising a rotatable shaft composed of two members connected with each other for rotation by a spiral feature in one member and a coöperating feature in the other member engaging with the spiral; means connecting one of the shaft members with the speedometer; a driven wheel rigid with the other shaft member, a wheel and a journal therefor mounted for swinging about the axis of the steering wheel for transmitting rotation of the same to the said driven wheel, said journal being adapted to partake of the up-and-down movement of the frame.

7. In combination with a motor cycle having a frame and a steering wheel mounted for up-and-down movement with respect thereto; a speedometer and driving connection therefor comprising a rotatable shaft composed of two members connected with each other for rotation by a spiral feature in one member and a coöperating feature in the other member engaging with the spiral, the pitch of the spiral being such as to permit easy longitudinal movement of the two members relatively to each other at their spiral engagement by direct longitudinal thrust of the one toward the other; means for maintaining said two members in axial alinement throughout the range of their spiral engagement; means connecting one of said shaft members with the speedometer; a driven wheel rigid with the other shaft member, a wheel and a journal therefor mounted for swinging about the axis of the steering wheel for transmitting rotation of the same to the said driven wheel, said means being adapted to partake of the up-and-down movement of the frame.

8. In combination with a motor cycle having a frame and a steering wheel mounted for up-and-down movement with respect thereto; a speedometer and driving connection therefor comprising a rotatable shaft composed of two members connected with each other for rotation by a spiral feature in one member and a coöperating feature in the other member engaging with the spiral; means connecting one of said shaft members with the speedometer; means carried concentrically about the axis of the steering wheel for journaling one end of the other shaft member; connections carried thereby for transmitting the rotation of said steering wheel to said shaft member, the journaling means being adapted to partake of the up-and-down movement of the frame.

9. In combination with a motor cycle having a frame and a steering wheel mounted for up-and-down movement with respect thereto; a speedometer and driving connections therefor comprising a rotatable shaft composed of two members connected with each other for rotation by a spiral feature in one member and a coöperating feature in the other member engaging with the spiral, the pitch of the spiral being such as to permit easy longitudinal movement of the two members relatively to each other at their spiral engagement by direct longitudinal thrust of the one toward the other, said members being telescoped with each other for maintaining them in axial alinement throughout the range of their spiral engagement; means connecting one of the shaft members with the speedometer, and means carried concentrically about the axis of the steering wheel for journaling one end of the other shaft member; connections carried thereby for transmitting rotation of said steering wheel to said shaft member, the journaling means being adapted to partake of the up-and-down movement of the frame.

10. In combination with a motor cycle having a frame and a steering wheel mounted for up-and-down movement with respect thereto; a speedometer and driving connections therefor comprising a rotatable shaft composed of two members connected with each other for rotation by a spiral feature in one member and a coöperating feature in the other member engaging with the spiral, the pitch of the spiral being such as to permit easy longitudinal movement of the two members relatively to each other at their spiral engagement by direct longitudinal thrust of the one toward the other; a tubular casing in which said two members are inclosed throughout the range of their spiral engagement; means carried thereby for transmitting rotation of the steering wheel to the shaft; a bracket secured to said casing for keeping one end thereof concentric with the steering wheel, said bracket being adapted to partake of the up-and-down movement of the frame.

11. In combination with a motor cycle having a frame, a steering wheel and links connecting it to the frame for up-and-down movement with respect thereto, a speedometer mounted on the frame and a driving connection therefor comprising a rotatable shaft composed of two members connected with each other for rotation by a spiral feature in one member and a coöperating feature in the other member engaging with the spiral, one of said shaft members being connected with the speedometer, an arm pivoted for swinging about the axis of the steering wheel, and rotatable connections carried by said arm for transmitting the rotation of said wheel to the other shaft member, the said arm being longer than the aforesaid connecting links and being mounted for movement with the same.

12. In combination with a motor-cycle having a wheel-carrying fork, a wheel journaled therein, a second fork and a frame carried thereby, means connecting the two forks at their upper ends adapted to permit their relative longitudinal movement, and a link connecting the lower ends of the forks, a speedometer mounted on the frame, and a driving connection therefor comprising a rotatable shaft composed of two members connected with each other for rotation by a spiral feature in one member and a coöperating feature in the other member engaging with the spiral, one of said shaft members being connected with the speedometer, an arm pivoted for swinging about the axis of the motor-cycle wheel, and rotatable connections carried by said arm for transmitting the rotation of said wheel to the other shaft member, the said arm being longer than the fork-connecting link and being mounted for movement with the same.

13. In combination with a motor-cycle having a wheel-carrying fork, a wheel journaled therein, a frame and a second fork mounted therein, means connecting the two forks at their upper ends adapted to permit relative longitudinal movement of the forks; a link connecting the lower ends of the forks and a speedometer mounted on the frame; a driving connection therefor comprising a gear wheel fast on the motor-cycle wheel; an arm pivoted on the wheel-carrying fork for movement with the aforesaid link, said arm being longer than the link, a pinion carried by the arm and meshing the gear wheel, a rotatable shaft comprising two members which are connected with each other for rotation by a spiral feature in one member and a coöperating feature in the other member engaged with the spiral, the pitch of the spiral being such as to permit easy longitudinal movement of the two members relatively to each other at their spiral engagement by direct longitudinal thrust of the one toward the other, said members being telescoped with each other for maintaining them in axial alinement throughout the range of their spiral engagement, a telescoping tubular casing in which said two members are inclosed throughout the range of their spiral engagement, and means connecting the shaft with the pinion.

In testimony whereof, I have hereunto set my hand, at Chicago, Illinois, this 8th day of February, A. D., 1910.

JOHN KERWIN STEWART.

Witnesses:
J. V. FAIRFAX,
W. M. McARDLE.